March 3, 1970 F. P. WILLCOX 3,498,439
PHOTO-OPTICAL CODE TRANSLATOR AND SELECTOR
Filed July 21, 1967 7 Sheets-Sheet 1

F. P. WILLCOX, INVENTOR
By: Homer R. Montague ATTY.

March 3, 1970 F. P. WILLCOX 3,498,439
PHOTO-OPTICAL CODE TRANSLATOR AND SELECTOR
Filed July 21, 1967 7 Sheets-Sheet 2

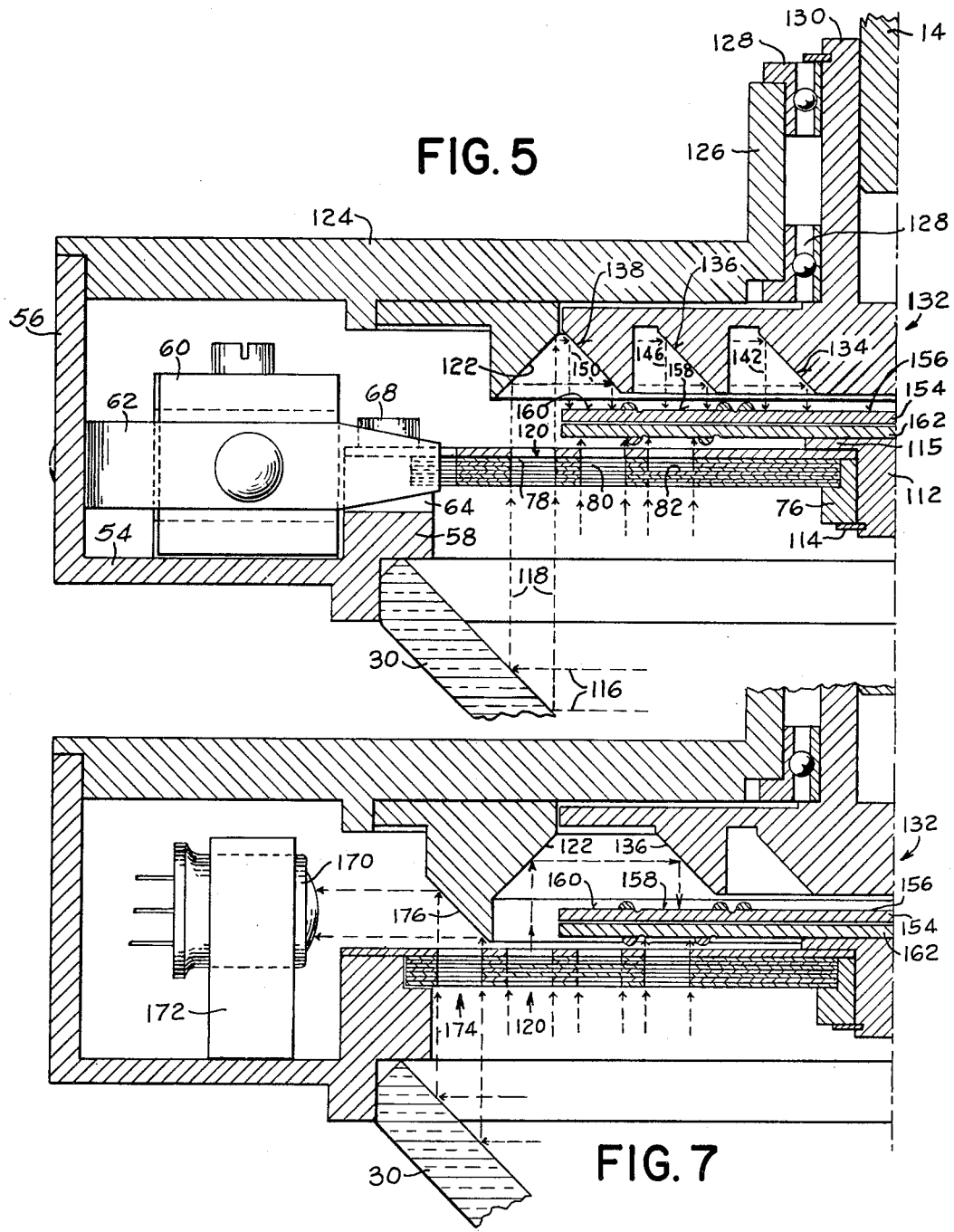
FIG. 5
FIG. 7
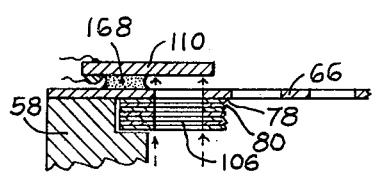
FIG. 6

March 3, 1970    F. P. WILLCOX    3,498,439
PHOTO-OPTICAL CODE TRANSLATOR AND SELECTOR
Filed July 21, 1967    7 Sheets-Sheet 4

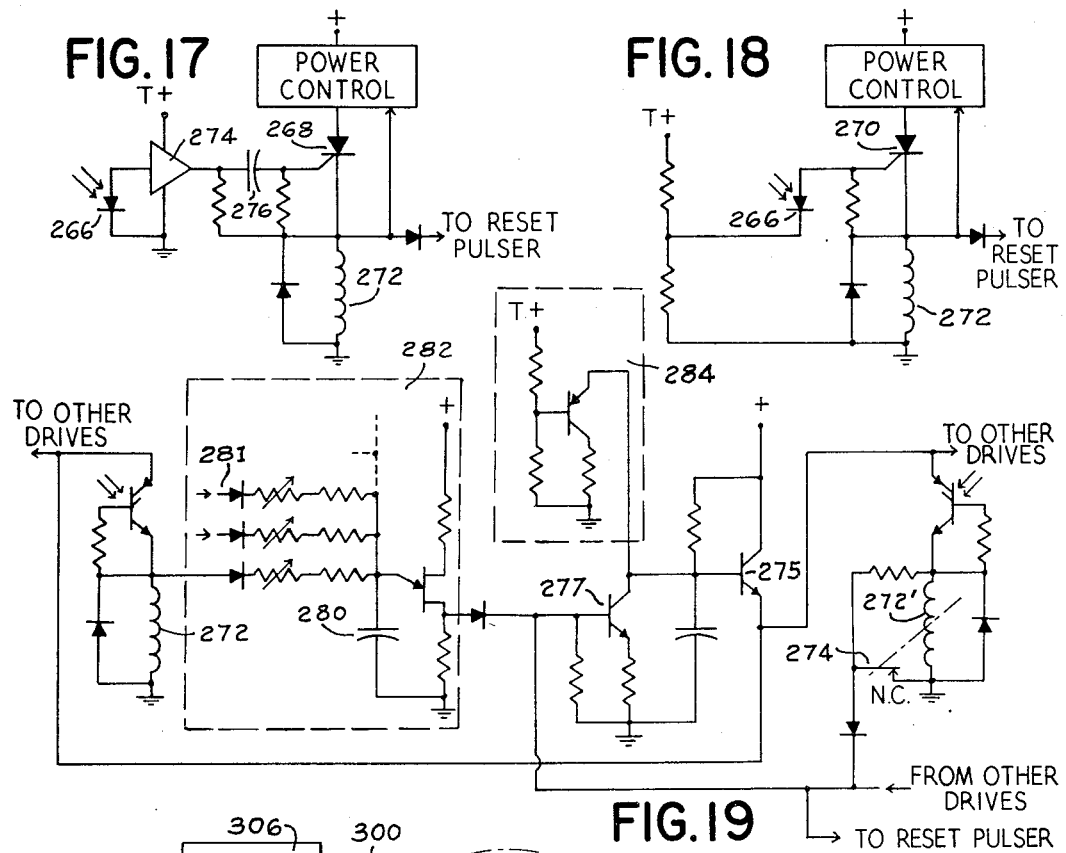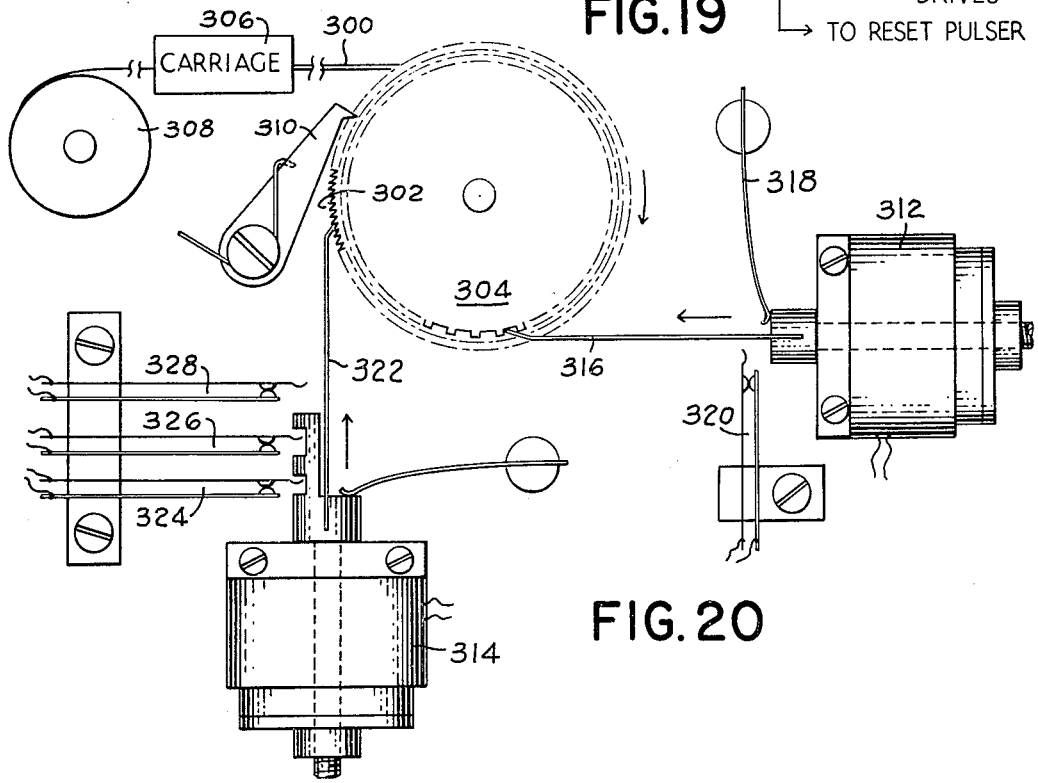

United States Patent Office 3,498,439
Patented Mar. 3, 1970

3,498,439
PHOTO-OPTICAL CODE TRANSLATOR
AND SELECTOR
Frederick P. Willcox, 565 Oenoke Ridge,
New Canaan, Conn. 06840
Filed July 21, 1967, Ser. No. 655,091
Int. Cl. B41j *23/04;* H04l *17/24;* B41b *23/00*
U.S. Cl. 197—18                                  18 Claims

ABSTRACT OF THE DISCLOSURE

A single, unitary and self-contained photo-optical code translating and selecting mechanism especially for a code controlled character printing machine having a rotary character font, said mechanism using binary-positioned apertured code translating shutters controlled by the code bits to define for each code combination a unique light path to a photoelectric sensor assembly. The resulting selection specifies the complete set of control operations associated with character printing (selection of the character, control of font drive including determination of the optimum drive direction, sensing of initial and final approach to printing position, braking of the font, final indexing of font position, printing, selective variation of printing pressure, and incremental spacing feed between font and record medium for spacing, proportional spacing, and justification) as well as those associated with non-printing or stunt-box functions (such as code checking, word spacing, character shifts, line feeding, format tabulating, and auxiliary device controls). Construction of the mechanism on essentially a single axis of symmetry for both the mechanical and optical systems, which axis may also be the axis of the font, facilitates direct coupling to the controlled shaft of the character font in a printer, reduces cost and complexity, and increases compactness.

Cross-reference to related application

Reference is made to applicant's copending application, U.S. Ser. No. 581,020, filed Sept. 21, 1966, which fully discloses a printing machine including an electromechanical (that is, non-optical) code translator and selector for which the device of the present invention can be directly substituted. The disclosure of that prior application is included herein by this reference, to avoid repetition of a description of various details of a typical printer with which the present invention can be employed.

Background of the invention

Code-controlled electrical character printers include such common machines as certain kinds of electric typewriters, printing calculators, teletypewriters, business machine or computer output printers, and the like. A wide variety of printing or imprinting mechanisms are used in various designs of such machines, for example those using individual type bars arranged in what is called a type basket, sliding type bars as employed in adding machines or some tabulating-type business machines, rotating type wheels or drums, and so on. All such machines require some means or mechanism by which code sequences, whether received over transmission channels or from a local keyboard, are translated into machine operations required to carry out the printing functions and auxiliary functions which are necessary. In the case of rotary type font wheels or the like, in which character selection is achieved by angular control of a shaft carrying the font element to bring the selected characters in turn to an imprinting position, the same selection mechanism can also be utilized to control nonprinting functions such as character spacing, backspacing, carriage return and line feed operations, and many other. However, the translating and selecting mechanisms can become quite complex and unwieldy.

In the prior application mentioned above, the font element is in the form of a spool, whose shaft is driven one way or the other to bring the spool to a desired angular position in the shortest possible time, after which the selected type bar (mounted pivotally on the spool) is thrown up to printing position and thereafter impacted against a printing ribbon or the impression paper. Control of the driving action for the shaft, both as to direction and magnitude of the rotating impulse, and control of rapid stopping of the shaft at the desired angular position, as well as a host of other functions necessary in the machine, were in that application effected by a single self-contained electro-mechanical unit which energized the necessary groups of circuits for each incoming code group of signals. That arrangement involved the magnetic shifting of contact wires or feelers to complete a circuit or circuits, in accordance with which several binary slotted code discs had been moved to positions of slot-alignment.

Summary of the invention

According to the invention, the input control signals, whether from a transmission channel, a keyboard, code tape reader or whatever, are again employed to set selected ones of a coaxial plurality of apertured code discs, but in this case the angular or azimuthal location, around the axis, of the clear channel thus selected by the discs is sensed by optical and photoelectric means which are also rotationally symmetrical about the same axis as the code discs. Among the advantages of this arrangement are the complete elimination of any drag or frictional forces that were formerly applied to the code discs by the sensing wires or the like mechanical feelers, and the elimination of the inertia and mechanical inaccuracies associated with such feelers. Moreover, since the position around the axis of the binary-selected clear channel through the code disc assembly in and of itself provides a position-indicating light-transmitting path, allowing light to pass through, the selected position can readily be sensed directly by either a fixed or rotary photocell arrangement. In the case of a fixed photocell assembly, the use of a rotary optical beam-position rotating means directly coupled to the font shaft enables a very direct control of the shaft drive and control elements to match the position of the shaft with that called for by the code signal. All of these variant arrangements further have the advantage of eliminating the need for selectively energizable power devices associated with the mechanically movable wires or feelers, to move them, or a selected one of them, into reading engagement with the code disc slots, and to restore the feeler back away from the code disc assembly in preparation for a following selection.

The photo-optical sensing and control devices of the present invention further simplify the problems involved with the accomplishment of a large number of non-printing functions, such as those listed in the prior application mentioned above, but in addition the functions associated with the provision of so-called "proportional spacing" printing, by which is meant the spacing out of printed characters by differential amounts in accordance with the actual set widths of the different characters. As taught herein, the same function may effect selective printing pressure (imprint) control in accordance with character-face area. The successful accomplishment of the differential-spacing aim by prior art techniques has always been extremely complex and expensive, yet the way in which the problem is solved by the present invention is notably simple, as will appear. The new system also provides a very simple and novel way of producing a modulated amplitude of the driving energy applied to the rotary shaft when the next character to be printed (or function to be performed) involves only a small rotational requirement—that is, when the newly selected shaft position is relatively near the last previous position. The invention does this by a selective pulsing or interruption of the sensing light beam itself, preferably by light-beam path interrupting means associated with the rotary reflecting arrangement connected to the font shaft, so that the beam is "chopped" to reduce its effective intensity in those cases in which a reduced energy shaft-driving impulse is required. Namely, the chopping action comes into effective play only when a shaft position is called for that involves only a small rotation of the font shaft, while a full driving impulse is provided for all other conditions requiring up to a full turn of the shaft by the driving means.

Brief description of the drawings

FIG. 5 is a sectional view taken on line 5—5 of FIG. 4 showing the optical paths to and through the code-selecting binary apertured discs and thence to the photoelectric sensors.

FIG. 6 is a fragmentary sectional view taken along line 6—6 of FIG. 4, illustrating one of the photoelectric sensing means for control of a "non-printing" function not involving font-shaft rotation.

FIG. 7 is a view similar to FIG. 5 showing an alternate arrangement for non-printing function code sensing.

FIG. 17 is a schematic wiring diagram of a typical form of font-shaft drive control circuit for the machine.

FIG. 18 is a view similar to FIG. 17 of an alternate control circuit.

FIG. 19 is a schematic wiring diagram of a power control circuit used with the invention, showing two different forms of drive control circuits, one involving a mechanical contact set and the other without such contacts, as required for different controlled components.

FIG. 20 is a schematic view illustrating one way of obtaining differential increments of printing carriage advance, for use in a machine providing proportional letter-spacing.

Description of the preferred embodiments

Figure 1:
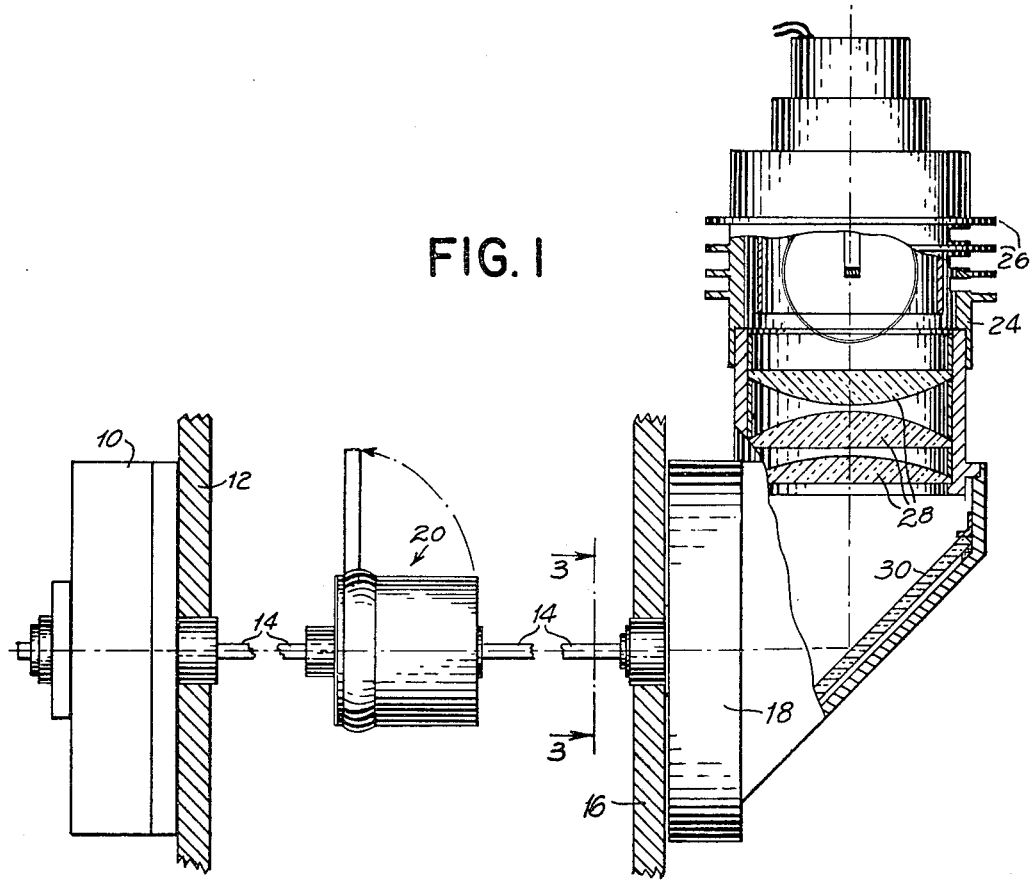
FIG. 1 is a schematic elevation, partly in section, showing the general orientation of the selector mechanism with respect to other parts of a printing machine (for example) as otherwise disclosed in the prior application.

As indicated above, and apart from additions concerned with the proportional spacing feature, the present application is concerned entirely with a modified construction of the code-controlled selecting and translating unit of the prior application. The rest of the machine may be as described in the prior case, and FIG. 1 is presented in order that the reader may be oriented as between the two applications. Thus, in that FIG. 1, numeral 10 indicates as a whole the font shaft drive, brake and indexing unit indicated by numeral 1006 in FIG. 10 of the prior application. It is mounted on the left side main chassis wall 12 of the printing machine, and controls the successive positions taken up by the non-circular font shaft 14 which extends across to and through the right side frame wall 16 and into the selector unit 18, suitable shaft bearings being of course provided. The font unit or spool indicated as a whole by number 20 is precisely as described in the previous application, sliding along shaft 14 to accomplish printing of characters along a line of the impression paper.

It is the selecting and translating unit 18 with which the present invention is mainly concerned. It is a photoelectric sensing unit controlled by code discs that in effect "decode" incoming binary pulse signals and translate their meaning into terms of either (a) an angular character-selecting rotation of the font shaft, or (b) the switching of some non-printing function instrumentality. Apart from the settable code discs and their binary setting magnets, the unit 18 contains a single moving part, which in one embodiment is a rotary light-directing optical unit having rotational symmetry, and secured to the right end of the font shaft, and in another embodiment is a rotary element carrying a special array of individual light-sensitive areas which are typically of silicon "solar cell" type.

In both of the embodiments referred to, the code discs, when set in a particular combination of their respective binary on-off or zero-one positions, establish a single unique light-transmitting clear path or channel, situated at a particular angular position around the axis of symmetry. In the case of a printing function (character selection), such position is sensed in its relation to the present or existing position of the font shaft, and the drive unit 10 accordingly energized and controlled to bring the font to the proper position (and over the shortest angular path) to print the selected character. In the case of a non-printing function, the passage of light through the clear channel energizes a photoelectric sensor which is individual to that angular position, and thus controls the desired action.

To provide a source of illumination for the photoelectric devices, FIG. 1 shows mounted upon the right side wall of the selector unit 18 a lamp house or the like, including a conventional incandescent bulb 22 in a preferably ventilated and baffled housing 24 having cooling fins 26 if desired, the lamp supplying light which is concentrated into a collimated beam by the conventional optical condensing system of lenses 28. This beam is directed to a 45-degree reflector 30, and thence passes into the selector unit proper. The beam is of sufficient size to illuminate at least an entire outer ring area of the selector (code) disc assembly, and thus the setting of the code discs will allow passage of light from the beam only along a small cross-section optical path at a particular azimuth and thence to the shaft-mounted rotatable reflector unit (or a rotating photocell array).

Figure 2:
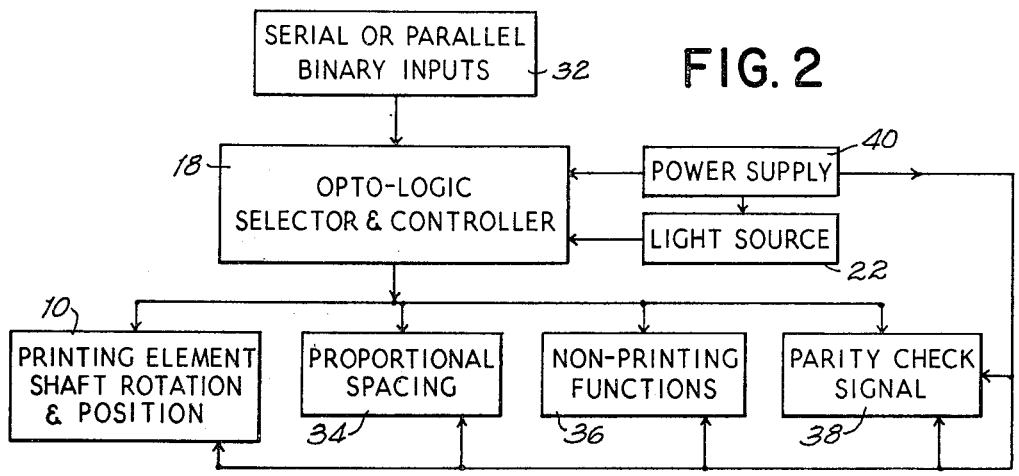
FIG. 2 is a simplified block diagram of the control and energy paths from the signal source (and power supply) through the main logic and control instrumentalities of the printing machine incorporating the present invention.

FIG. 2 is an explanatory block diagram of the general arrangement and relationship of major parts. The photo-optical selector unit is again designated 18, and the light source by 22. Numeral 32 indicates the source of input coded signals, either serial or parallel in form, which cause the selective operation of the two-position (binary selecting) code disc magnets to be described in detail below. The code discs being set to determine a particular optical clear channel through them, at a particular angular position about the shaft axis, light is allowed to pass through that channel from light source or bulb 22, and a photoelectric sensor controls the resulting operations. Where a character selecting (printing) function is to be performed, the photocell output controls unit 10 to drive the shaft and stop it at the proper selected position for character printing. If the machine is of the proportional letter-spacing type, another signal is derived from the code-selected clear channel at another location in the unit, and goes to unit 34 to cause or control the differential advance of the character-printing position.

Where a non-printing function is being selected, the output signal from the selector passes to the non-printing function controls symbolized at block 36. Finally, the validity of the decoded signal can be checked in any desired or conventional manner as by the block 38. This check may go on simultaneously with the physical positioning of the font shaft, and may involve a comparison of an initially received parity bit (part of the transmitted code) with a parity indication derived from the photo-optical selector. Power for operating all of these devices is shown as derived from the power supply block 40. It is repeated that the novelty presented in the present application is principally concerned with the photo-optical logic or selecting and translating unit 18, but to a degree also with the proportional spacing mechanism 34, whose simplicity is a direct result of the particular features of unit 18. It may also be appropriate to mention here that terms such as "printing" or "imprinting" used in this description are not to be taken as limiting the logical unit, or selector and translator, to controlling an impact-printing font. The basic problems of character and function selection are shared with, for example, the photocomposing field, and indeed similar problems are present in many shaft-positioning and programming operations.

Figure 4:
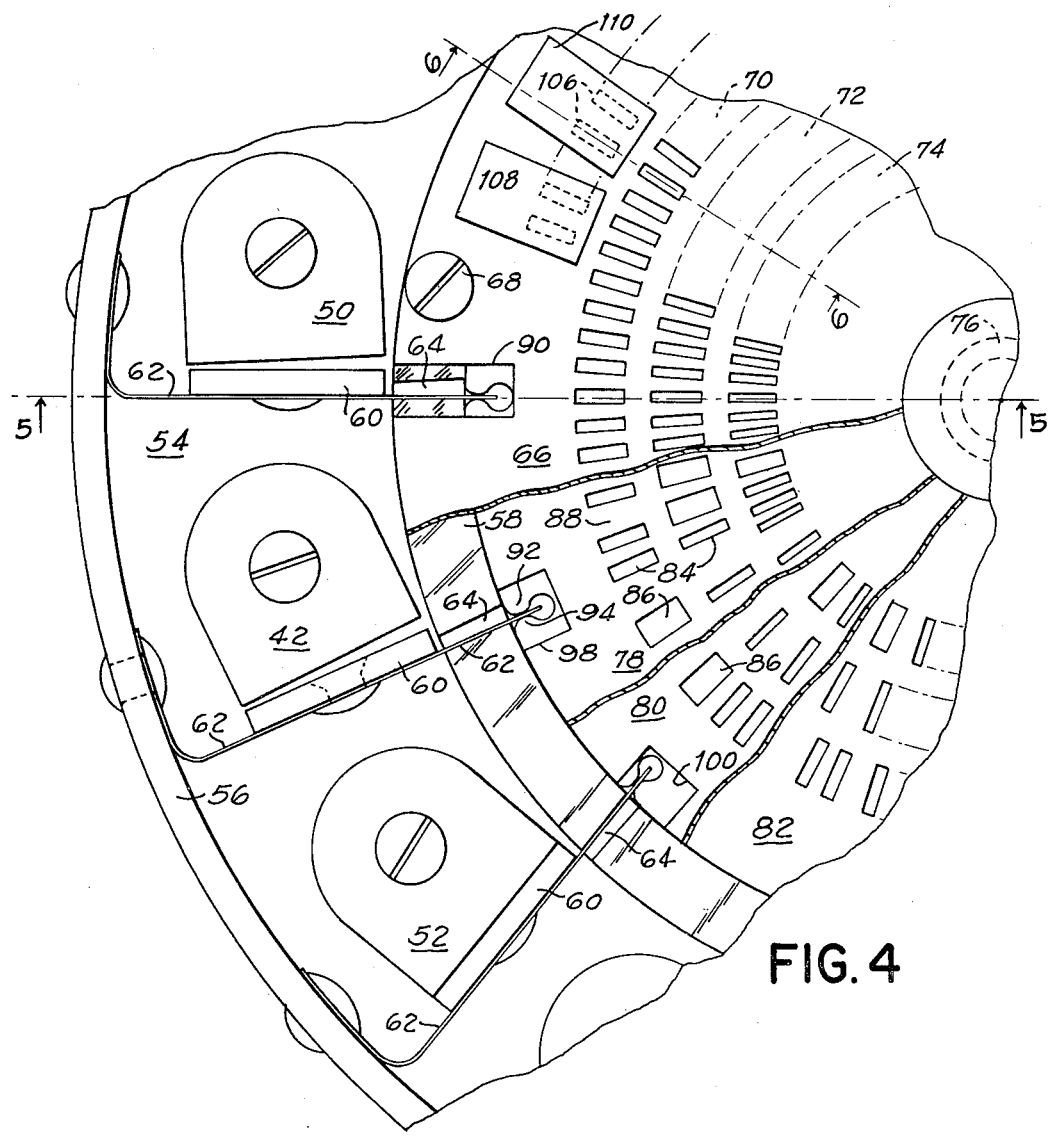
FIG. 4 is an enlarged view of a portion of the selecting unit oriented the same as in FIG. 3, showing further internal construction details, the casing cover here being completely removed for clarity.
Figure 3:
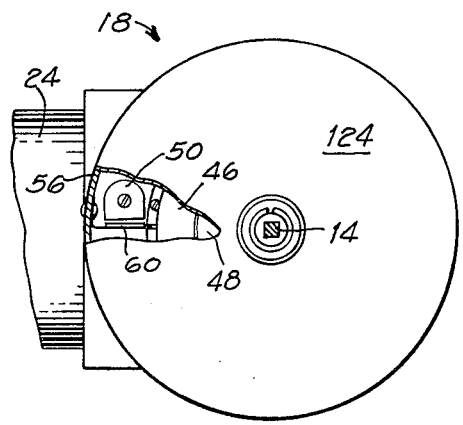
FIG. 3 is a sectional view taken essentially on line 3—3 of FIG. 1, the side frame plate of the machine chassis being eliminated for clarity, and a part of the thus-revealed photo-optical logic and selecting unit having its casing wall or cover also broken away.

Turning now to FIGS. 3 and 4 of the drawings, FIG. 3 illustrates what would be seen if shaft 14 were cut at line 3—3 of FIG. 1, and selector 18 removed from its supporting wall 16 and viewed along the shaft axis. A small section of the casing cover (124) for the unit has been cut away, to show underlying structure, including one of the disc-setting code magnets (50), its armature 60, a small section of a fixed reflecting annular ring 46, and a portion 48 near the outer rim of the rotating optical-path deflecting element secured for rotation with shaft 14. FIG. 4 shows more of the said underlying structure, but with the fixed and rotating reflecting or deflecting elements entirely removed, to illustrate more clearly the code disc arrangement and other parts.

In FIG. 4, three of the code selecting magnets are shown, including the one (50) shown in FIG. 3, as well as the ones 42 and 52 following it. These magnets occupy a certain angular space around the outer marginal area of the cylindrical unit casing, and the number of such that are provided is governed by the coding scheme employed—i.e., how many "bits" comprise a complete character or function defining group. The magnets are mounted on the bottom 54 of an annular space or well formed as part of the cylindrical casing; specifically, between its outer wall 56 and an inner wall 58 which is axially of shorter height. Each code magnet has an armature 60, secured as by a rivet to a leaf spring 62 whose outer end is secured, again as by riveting, to the outer wall, and these springs extend radially inward through slots such as 64 in the inner annular wall 58. The edges of these slots limit the two extreme positions of the leaf spring "fingers" when the corresponding magnets are energized or de-energized. Thus, magnets 42 and 50 are shown de-energized, and their leaf springs rest upon the lower edges of their slots 64, while magnet 52 is shown energized, and its leaf spring presses against the upper edge of its slot 64.

An opaque cover plate or "comb" plate 66, circular in outline, is secured to the upper annular edge of inner wall 58 as by screws 68 (see also FIG. 5) and provides a plurality of rings of narrow rectangular code channel defining apertures 70, 72 and 74 which extend around so much of the surface of the plate as is required by the number of code bits employed (and thus by the number of magnets provided). The plate 66 is thick enough to be stiff and form a rigid support for a central journal bushing 76 to be described below, and on which are journalled for limited angular rotation a set of apertured opaque code discs of which discs 78, 80 and 82 are shown in FIG. 4, these being preferably thinner than the cover plate 66. Each of the code discs has selected-position rectangular apertures such as 84 spaced thereon in rings spaced to conform to those in cover plate 66, but the apertures being provided only according to a conventional binary coding scheme so that when some of the code magnets are energized and others are not, a particular one of the apertures in the cover plate will be allowed to transmit light from the light source to sensing means to be described. It may be explained that the wider apertures (such as 86) in the code discs are the result of providing apertures of standard size at two adjacent positions, while the wider non-apertured spaces (such as 88) result from the omission of an aperture from the regular series of possible aperture positions. Cover plate 66 has alternating apertures and non-apertured positions regularly spaced throughout the entire ring array (for each of the three ring radii), while the underlying code discs are provided with only some of the possible apertures. The coding scheme by which a unique angularly-located clear channel through the entire set of code discs (and the cover plate), for each combination of energized magnets, is entirely familiar to those skilled in the art, see for example, Drillick patent, U.S. 2,944,471, but the coding scheme is susceptible of many possibilities of variation, as well understood by skilled workers in this field, especially in connection with permutated-code devices for teleprinters.

The way in which the magnets control the shifting of the code discs will now be explained. The cover plate 66 has a rectangular edge slot such as 90 around the area of shifting operation of each of the leaf spring fingers 62, to avoid interference therewith. The finger 62 of magnet 50 projects through the slot 64 in the annular wall, and thence between two facing projections 92, 94 of the uppermost code disc 78, these projections being provided by notching (so to speak) the rim of the code disc in the generally arcuate configuration illustrated, which allows the movement of the leaf spring finger to move the code disc freely without binding through the small arc required for a shift of one aperture-space; that is, the arc necessary to bring one of its typical apertures out from behind the material of opaque cover plate 66 between two of its apertures, and into registry with one of those apertures. Since the leaf springs 62 are relatively wide in the axial direction (as shown better in FIG. 5), all of the underlying code discs beneath cover 66 are also provided with appropriate edge clearance slots, shown as rectangular, for example, at 98 for the top code disc 78, and at 100 for the next lower code disc 80. The next lower code disc is indicated at 82, and it and all others will be understood to have their own leaf-engaging formations and clearance slots as shown for the upper discs. Only some of the code disc light-transmitting apertures are shown, but it will be understood from the chain-line extensions of their rings of apertures that these continue as far as necessary around the indicated arcuate paths.

The rings of code disc apertures described above are concerned with defining the identity of a character to be printed, and controlling the font shaft drive mechanism to move it in the proper (shortest) direction for quickest character positioning, and such like printing functions. In the peripheral region of cover plate 66, preferably in regions outside which there are no code magnets (to avoid interference), such as above magnet 50 in FIG. 4, the cover plate is provided (in this embodiment) with additional apertures such as indicated at 106, and light will be allowed to pass through one of these, via further coded apertures in the corresponding areas of the underlying code discs, when a non-printing function is being selected by the code magnets. To this end, small photoelectric sensors preferably of the flat solar-cell type are shown at 108 and 110, suitably mounted directly on the cover plate 66, each controlling a corresponding circuit for a particular non-printing function. Additional such apertures and cells are suggested by arcuate chain lines for this row. This arrangement, detailed in FIG. 6, and an alternate one, will be understood more fully from what is said below.

FIG. 5 of the drawings shows the parts as described in connection with FIG. 4, but in half radial section taken along line 5—5 of FIG. 4. To avoid needless repetition, the parts already described and which need no further explanation, are merely indicated by the corresponding numbers of reference. It will be observed that the code discs (only the three already numbered have been numbered here, although a total of seven are shown) lie directly one upon another, and are loosely secured, for relative rotation by the code magnets, by the rabetted bushing 76 bottomed against the underside of cover plate 66 and forming the journal for the code discs which of course are centrally apertured to fit the bushing. This bushing is made of hard metal and surrounds and is secured to a short shaft 112 as by a C-ring 114. The upper end of this short shaft is preferably enlarged at 115 to provide a boss surface of substantial area to which the sensing ring-formed photoelectric cell array 162 is secured, as by cementing thereto. The path of the light furnished from the source already described is indicated by the dotted lines and arrows, said light initially proceeding from the source as at 116, turning 90 degrees at the reflecting surface of mirror 30 and approaching the code disc assembly at 118, the entire annular area of the assembly being flooded at least in the region occupied by code apertures. For example, if the code discs happen to set the provide a clear channel through themselves and the cover plate 66 at 120, the light will pass through and be reflected to the right at the reflecting surface of a fixed conical-faced ring 122 secured on the inner face of the casing cover 124 of the selector unit.

The cover 124 of the unit casing is the face thereof which lies against the printing machine's right-hand chassis wall as described in connection with FIG. 1. At its central portion, it has an upstanding cylindrical mounting formation 126 which, when the machine is assembled, passes through a suitable hole in the machine side wall. This formation 126 contains ball bearings 128 which journal a coupling portion 130 of the rotatable optical deflecting device 132 to be described. The coupling 130 has a preferably non-circular bore slidably receiving the font shaft 14, as fully described in the previous application already mentioned, so that the optical deflecting device rotates strictly with the font shaft.

Device 132 has several important characteristics which can only with difficulty be understood from the showing in FIG. 5 alone. They will be followed better by referring now to FIGS. 8 and 9 of the drawings. The underside view (in isometric) of FIG. 8 clearly indicates the shape and configuration of the device 132. At the central portion of its underside, a boss provides an upstanding conically configured reflecting surface 134, continuous around the periphery of the boss. At a larger radius (that is, outward of the surface 134), an upstanding substantially 180-degree ring provides a semicircular conically configured reflecting surface 136. On a still greater radius, and specifically at one region of the peripheral margin of the device, there is an "index" 45-degree reflecting surface 138 of width only sufficient to direct light in a beam of the shape corresponding to that passed by a clear channel through the code disc and cover plate apertures already described.

Figure 8:
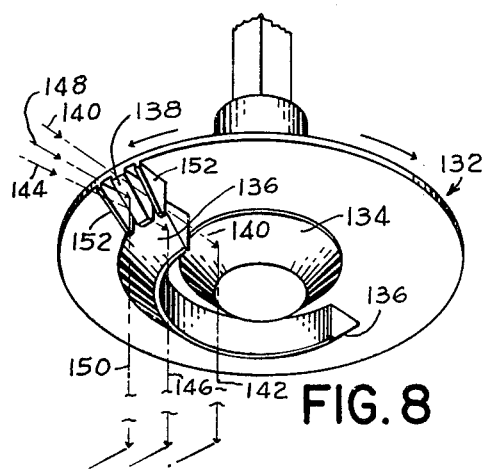
FIG. 8 is an isometric view of an end portion of the controlled font shaft, having attached thereto the single multiple-function optical path controlling device in accordance with one embodiment of the invention.
Figure 9:
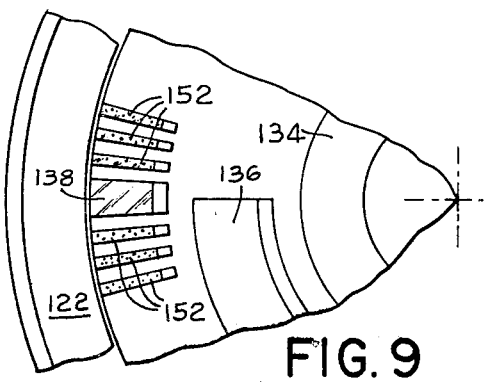
FIG. 9 is a fragmentary view, to a larger scale than FIG. 8, of a portion of the same optical element looking from below FIG. 8, and showing its relation to a fixed optical element of the system.

The radial center line through this small surface 138, as shown better in FIG. 9, passes precisely across the terminal end of the reflecting surface 136. A theoretical "single" ray of light such as at 140 in FIG. 8, arriving from the reflector ring 122 of FIG. 5 through a clear channel through the code discs and their cover plate, and which ray in FIG. 9 goes past the end face of reflector semi-ring 136, will proceed to the inner reflecting surface 134, and thence downward, by reflection, in the direction 142, and will ultimately strike a photocell (156) (using this term as a convenient abbreviation for a particular sensitive area of a solar-cell type of array to be described) controlling the clockwise font shaft drive action. The same path would be followed by other rays striking the inner conical reflector surface 134. However, a ray arriving as over the path 144 in FIG. 8 will be intercepted by the semi-conical reflecting surface 136, and directed down as at 146 to a different photocell area (158), corresponding to the opposite font-shaft rotation direction. Thus, the arrangement produces drive signals which depend upon whether the position of the font shaft called for by the code discs lies one way or the other with respect to the present position of the shaft as represented by the position of this complex optical device 132 as a whole.

Still referring to FIG. 8, it is clear that if the font shaft has been rotated just sufficient to bring the device 132 to a position where its outermost reflecting surface elements 138 intercepts the beam arriving from the code discs (as at 148), the said beam will be reflected downwardly over a path such as 150, and will ultimately reach still another photocell sensing area (160), to signal that the font shaft has arrived at the position called for by the setting of the code discs. It will be noted that, in arriving at this called-for position, the rotation of the device 132 will cause the beam to be "chopped," or interrupted, or cut off, by the passage through it of one or more of what might be called partitions, or fairly thin upstanding wall segments 152 spaced on either side of the reflector 138. These are shown as having 45-degree surfaces like that of reflector 138, but this is a convenience of manufacture, and the surfaces at 45 degrees are made non-reflecting (e.g., black) as indicated in FIG. 9 so that the beam that strikes them will be absorbed, or cut off. The cut-off of the beam as the final position is approached is utilized to provide braking control where required, to modulate the driving force applied to the font shaft when the next character called for lies physically close, in font order, to the position of the previously selected character, and for other purposes to be elaborated below.

It is noted that the segments 152 in FIGS. 8 and 9 are essentially no wider than one-half of the spacing between adjacent characters on the font. Hence, when the "next" (or "adjacent") character on the font to the one just printed is called for, the beam will not be "chopped" at all, but will leave path 140 or 144 and follow path 148, 150 to the cell "index" area 160. Also, of course, when a "repeat" of the previous character is called for, there is no "chopping" as the element 132 does not move from its previously indexed position. Circuitry described below uses the fact of chopping of the sensor signal (as from 156, 158) to control the application of braking effort, which is not needed for "same" or "adjacent character" or even (depending on the design) somewhat greater movements of the font element. There may be a plurality of these segments 152 (see FIG. 9) which may then provide font-drive power modulation comparable to that described in the prior application.

Referring back now to FIG. 5, it will be seen that the particular angular position of the rotating device 132 there shown is one in which the section plane cuts through the center of the small reflecting surface at 138; this corresponds to the "final index" position specified by the code discs, when the font shaft has arrived where it should be for the next character selection, or function to be performed. Equally well, this position may be said to represent that where the device 132, and font shaft, would be left stationary in case a succeeding character is merely a repeat printing of the same one that was just printed. If FIG. 5 is visualized as it would appear after slight rotation of device 132 either way from the position shown, and keeping in mind the full-conical inner surface 134 and the half-conical reflector 136, the three different positions at which the light beam may pass toward the photocells can easily be understood.

Stated another way, the rotary reflector arrangement converts the code-defined azimuth (around the font shaft 14) which is opened up to provide a clear optical channel through the code discs, into a form in which the light beam is directed to an inner, a central, or an outer region each at a specific radius from the axis—inner if the required motion of the shaft is clockwise, central if the required motion is counter-clockwise, or outer if there is no need for driving the shaft (as for a repeat character). Referring still to FIG. 5 of the drawings, the way in which these three conditions are sensed will be explained.

Figure 10:
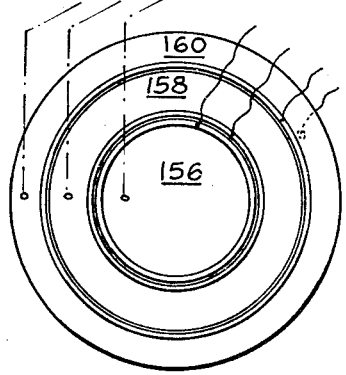
FIG. 10 is a plan view of the uppermost layer of the photoelectric sensing layers of FIG. 5.

Two back-to-back mounted photocell arrays are shown secured to the enlarged surface or boss 115 of shaft or post 112 in FIG. 5. The upward-facing array is numbered 154, and as shown in FIG. 10 in plan view, it provides three mutually isolated-output photoelectrically sensitive areas; the central area 156 which at times receives the light beam indicated at 142 in FIG. 8 from reflecting surface 134 to cause clockwise (CW) rotation of the font shaft, the intermediate ring area 158 which at times receives the light beam 146 of FIG. 8 from surface 136 to cause counter-clockwise (CCW) rotation of the shaft, and the outer ring area 160 which, when the index area 138 of FIG. 8 is aligned with the clear channel through the code discs, receives the light along path 150 of FIG. 8. Each of these sensitive areas has a connection lead to its solder ring terminal as shown in FIG. 10 (and appearing in section in FIG. 6), indicated on the drawing by the corresponding letters of designation CW, CCW or the word "Index." A common counter-electrode connection is provided for all of these cell areas by a conductive layer on the lower surface of the semiconductor support, as conventional in solar cell construction. The way in which light from the code disc clear channel reaches the appropriate drive-control cell area is clearly indicated by the dotted arrows in FIGS. 5 and 7.

Figure 11:
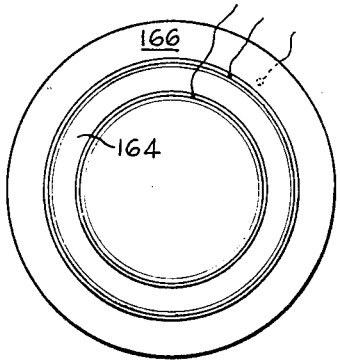
FIG. 11 is a view similar to FIG. 10 showing a modification of the sensing cell arrangement for use where proportional letter-spacing is involved.

It will be recalled that the code discs have besides the outer ring 70 of code apertures (FIG. 4) which provide the clear channel such as indicated at 120 in FIG. 5, two inner rings of code apertures 72 and 74. When a clear channel occurs through aligned code apertures of these lesser radii, the light from the source is reflected by the diagonal mirror directly (that is, by the diagonal mirror 30) through such clear channels and onto the downward-facing photosensitive ring areas of the second (lower) one 162 of the back-to-back photocell elements. The under side of this element 162 is shown in plan view in FIG. 11 as it would be arranged for a machine employing proportional spacing. The inner ring 164 would furnish a signal calling for a certain increment of letter spacing, the outer ring 166 for a different increment, and energization of neither one would provide a third spacing increment. A common ground connection for the cell areas is again indicated, and of course the central area of this face would not be photosensitive, as it is the region at which the two-cell assembly is cemented to the enlargement 115 of post 112 in FIG. 5.

Since there is some correlation (although only an approximate one) between the effective printing area of a character and its set-width, the same signals from ring areas 164 and 166 can be employed to modify the impulse supplied to the print magnet, for different characters. Thus, the degree of pressure or impact applied for different characters can be approximately related to the printing area thereof. Obviously, this function can be provided even in a machine having a mono-spaced type font, for there also the effective printing areas of the different characters are different from one another, though the set-widths may be identical.

As described above, the rotary position of optical element 132 in FIG. 5 is such as to bring the small "index" reflecting surface 138 into the section plane. FIG. 7 shows the appearance of the sectional view when element or device 132 is turned to remove 138 from the section plane, but with the segmental reflector 136 still lying in the optical path. The light path through channel 120 now goes from the fixed outer reflecting conical surface 122 to the segmental reflector 136, and the light thus would strike the photosensitive inner ring 158 of FIG. 10, calling for CW drive of the font shaft, if channel 120 is rendered "clear" by the code disc settings.

FIG. 7 also shows a modified arrangement for selecting non-printing functions. First, it will be recalled from the description of FIG. 4 that individual photocells 108 and 110 were shown at the top of the figure, to sense the passage of light through clear channels provided by code apertures such as 106 in the code discs (and their cover plate 66), these occupying angular regions of the construction which are outside the regions which have been described as devoted to drive control (printing) functions. The way in which light reaches the non-printing function cells is clarified by the sectional view of FIG. 6, the cells being mounted on the cover plate 66 as by cement 168. It is also possible to locate sensing cells for this purpose in those regions of the "annular well" between walls 56 and 58 that are not occupied by code magnets. An arrangement of this type is shown in FIG. 7, numeral 170 designating a conventional light-sensitive semiconductor device such as a light-activated SCR (LASCR) held in the well by a support 172 and receiving light from any clear channel 174 through the outermost code apertures of the code discs by reflection from a second conical reflecting surface 176 on the same fixed ring element that carries the fixed reflecting surface 122 already described. Since only a portion of the peripheral distance around the "well" between walls 56 and 58 is occupied by the usual number of code magnets (6 to 8 magnets, say), plenty of space remains for a considerable number of these non-printing function switches or sensors.

Figure 12:
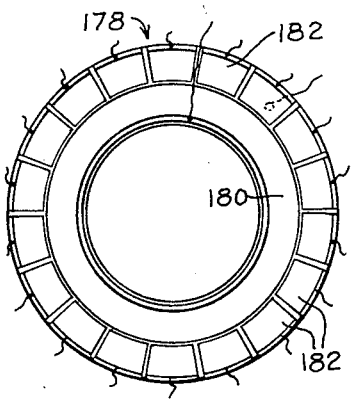
FIG. 12 is a face or plan view of an arrangement of photoelectric sensing portions of the lower of the two photoelectric sensing layers of FIG. 5, especially for use where proportional spacing is not involved.

In a form of the invention in which provision is not to be made for proportional spacing, the lowermost (downward-facing) photocell array 162 and photocells 110 or 170 of FIGS. 5 and 7 may be replaced by an array such as shown at 178 in FIG. 12. Here the central section is again plain (for cementing), while the photo-sensitive ring 180 is devoted to parity-check sensing by the use of code disc apertures in the inner ring of code disc apertures 74 (FIG. 4), while the periphery or margin of the array is made up of separate individual segments of photoresponsive surface, indicated by number 182. One of the latter is energized (each segment being connected for control of a non-printing function), by light passing through a clear channel selected by the concatenation of code apertures comprising the intermediate ring 72 thereof in FIG. 4, rather than the outer ring of that figure.

Figure 13:
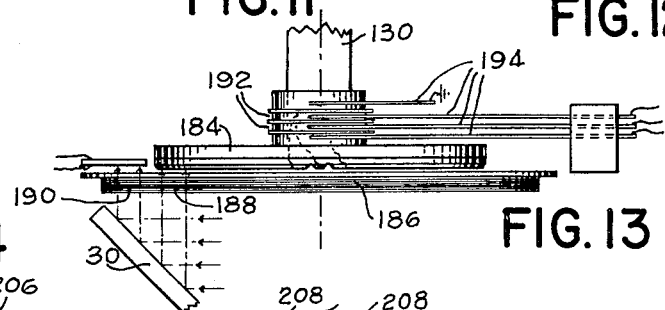
FIG. 13 is a schematic elevation or side view of a modified form of the selector mechanism in which the photoelectric sensing portions physically rotate with the controlled (font) shaft.

All of the forms of the invention described above have relied upon the use of a rotating optical reflecting unit or device to control its own drive (via shaft 14 and the drive unit 10, FIG. 1) by directing the light from a clear code-disc channel to appropriate fixed photosensing elements. An arrangement which is optically simpler, but involves the provision of a rotating photo-sensing array, is illustrated in FIG. 13 of the drawings. Here, the end of the shaft coupling 130 (as described above connected to the font shaft 14) directly carries a circular downward-facing photoelectric sensing array on a support disc 184. The code discs 186 are similar to those already described, and are "set" in the same way, but have only code apertures in two rings of different radii. These code aperture ring positions are shown at 188 and 190, and are illuminated by light from a reflector 30 as before. Connections to the individual cells of the arrays, or sensitive sub-areas thereof, are brought out by the slip rings 192 shown cooperating in a known way with the contact brushes or wires 194.

Figure 14:
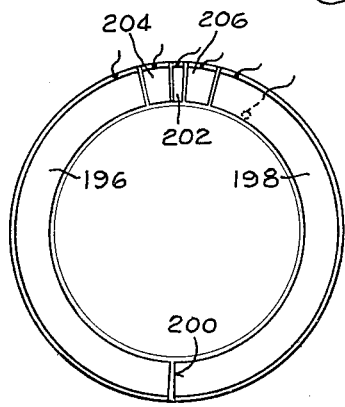
FIG. 14 is a view in plan, or a face view, of a photoelectric sensing arrangement for use with the modification of FIG. 13.
Figure 15:
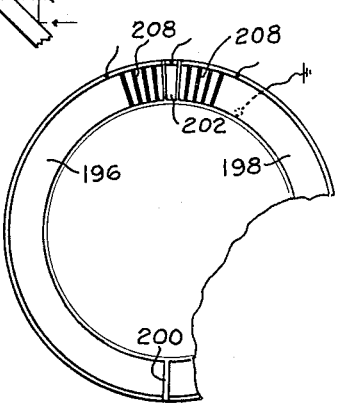
FIG. 15 is a similar view, partly broken away, of an alternate arrangement of the photoelectric sensing portions.

Face views of typical cell arrays for use in FIG. 13 are shown in FIGS. 14 and 15. In the former, the marginal sensitive ring provides two major segments 196 and 198, separated by a barrier (e.g., a groove 200 across the sensitive layer and through the solder terminal ring) to provide signals for clockwise and counter-clockwise drive respectively. A small section 202 diametrically opposite the barrier 200 provides the index sensing when the selected character has been brought to the printing position specified by the received code signal. Separate small sections 204 and 206 may be provided on either side of the index position, by similar grooving, to energize drive braking or what was called "half-power" drive in the previous application. In FIG. 15, about the same arrangement is provided as to segments 196 and 198, and the index segment 202, but the portion of each major segment adjacent to the index position is masked by opaque stripes 208, these providing the pulsing drive when a character selected requires only a slight motion of the font shaft, and the driving power must therefore be modulated to prevent overshoot. These mask strips accomplish the same function as the chopping ribs or wall segments 152 of FIG. 9, above.

Element 132 (of FIG. 8) is desirably fabricated of light material so as not to add very much to the moment of inertia of the assembly driven by the font shaft. Typically, it may be made in one piece, and of aluminum or other metal, or of molded plastic, with the inclined surfaces rendered highly light-reflecting (as at surfaces 134, 136 and 138) by spraying, evaporation coating or equivalent processes. The inclined faces of the portions 152 will of course be rendered non-reflective as described above, by non-reflecting paint or the like. Molding or casting of this part allows it to be made very economically in quantity production.

Typical system employing the above embodiments

Figure 16:
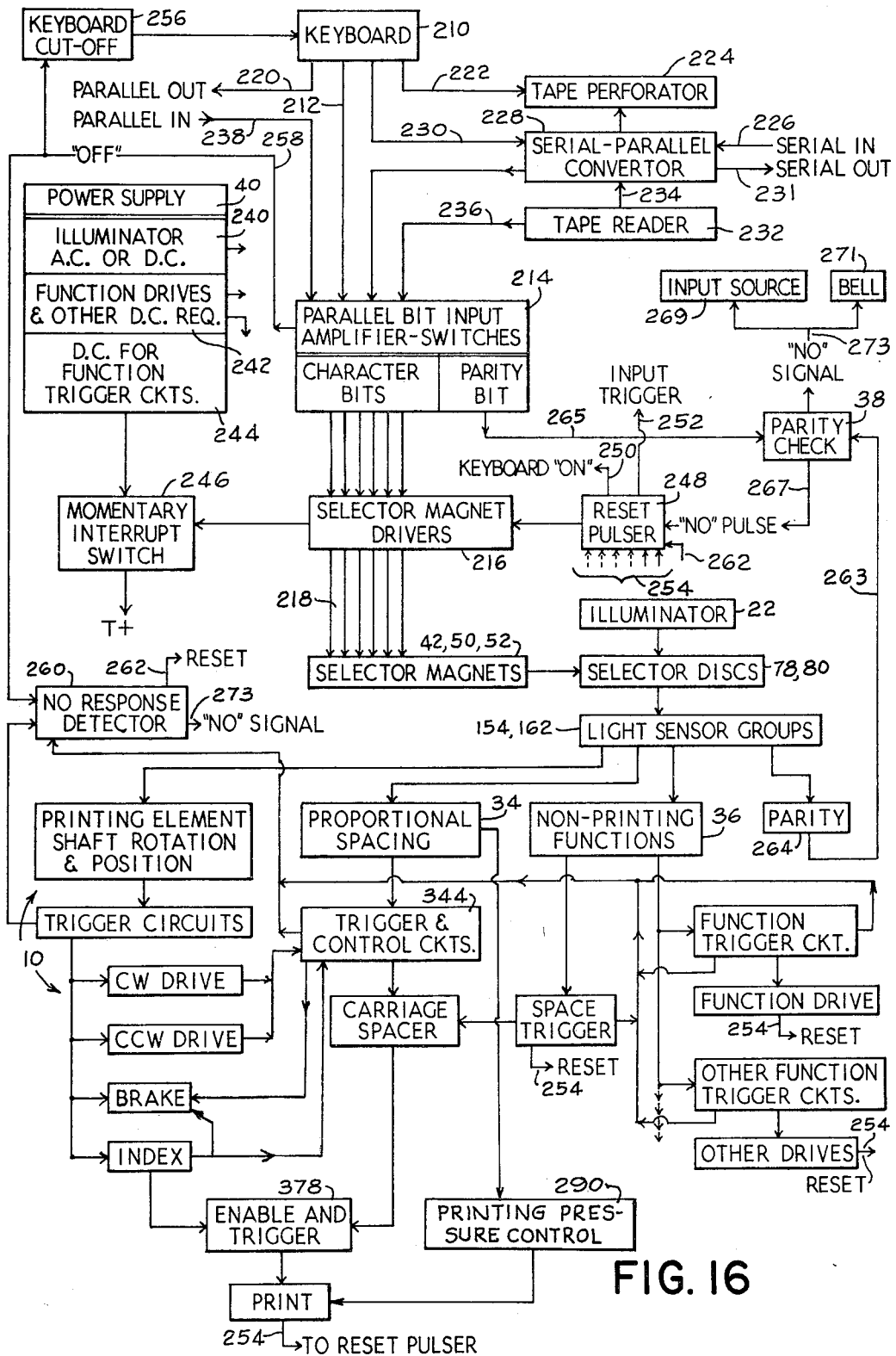
FIG. 16 is a schematic block diagram of the relations amongst the various electrical and electronic control and operating units of the machine as a whole.

FIG. 16 of the drawings is a functional block diagram, much more complete than FIG. 2, further explaining how mechanisms such as have been described above are controlled and operated in combination with other parts to form a complete printer station. In general, more complete details of most of the components not earlier detailed herein will be found in the prior application mentioned near the beginning of this specification.

Number 210 designates a typical control keyboard whose alphabetical, numerical and non-printing functional control keys serve to complete respective circuits which apply voltage to selected combinations of output terminal conductors. For example, one set of output conductors represented by numeral 212 serve to energize a set of parallel-bit amplifier switches indicated at 214, whereby the keyboard contact closures or selections are amplified and converted to a suitable form for energizing the selector-magnet driver stages indicated at 216, whose outputs at 218 energize the selector magnets such as already described at 42, 50, 52 in connection with FIG. 4. Alternate signal paths from keyboard 210 are also shown; thus, the signal path 220 may permit the same key operations to be used for any or general purpose auxiliary apparatus, recording, or the like, and where a perforated tape (or magnetic tape) or punch card record is desired, such is provided over the alternate signal path 222 shown as feeding a perforator 224. The latter may, alternately, be operated from some source of incoming digital signals as indicated at 226 where the source provides serial bit signals, these being changed to parallel form (for conventional perforator control) in the two-way or bidirectional serial-to-parallel convertor 228. This same convertor may be energized directly from the keyboard 210 over channels indicated at 230 where an auxiliary serial-bit output application requires, the output appearing at 231 (similarly to the parallel-bit output channel 220). Also, where the machine (printer) is to be controlled from a tape reader or the like as at 232, a channel 234 is provided, through the convertor 228 if serial/parallel conversion is needed, otherwise from reader 232 over the channel 236 direct to the input amplified switches at 214. An input to the latter from some other source (than the keyboard) of parallel bits is shown at 238. A great variety of input source connections and provisions for various outputs is thus obtained.

The general power supply 40 (compare FIG. 2) is illustrated as associated also with auxiliary supplies such as the supply (or at least, a possibly different voltage, or perhaps AC) for the light source 22, this supply being designated 240; a preferably DC source 242 for the function drives and other DC requirements, and an independent DC source 244 for supplying the function trigger circuits through the "momentary interrupt" switch 246, which ensures that the code selection operations are completed before a selected function is triggered. The output lead "T+" from this supply is extended to various ones of the circuits to be described below.

A reset pulser circuit 248 receives a signal from the parity check circuit 38 and "enables" the keyboard 210 (via lead 250) when the parity of the received code shows validity, and also triggers the next operation of such input sources as 224, 228 and 232 for the next code cycle, over lead 252. The input channels 254 to this pulser also enable the keyboard after the completion of a previously-selected function, by connections to be described below. The keyboard cut-off circuit 256 dis-enables the keyboard for a period after each key operation, under control of the amplifier switches 214 (and over lead 258), to prevent pile-up from too-rapid keying. The drawing also illustrates a "No-response" detector circuit 260 which provides an artificial reset signal over lead 262 when it happens that a function or selection operation is, for any reason, not completed within a specified time after the selection cycle has commenced. This prevents permanent lock-up of the machine by a garbled or missed operation, where a single error or omission is deemed preferable to a long interruption while the trouble is located. The various interruption while the trouble is located. The various inputs to this circuit 260 provide the stated operation (reset) regardless of the portion of the cycle during which the completion of function fails, and hence regardless of the source of the trouble. Also, a "No" signal over lead 273 to input source 269 and warning signal 271 will interrupt, if desired, the input of codes from the external source, and notify the operator.

The group of selector magnets 42, 50, 52, et cetera are represented by the "Selector Magnets" block so numbered to agree with FIG. 4, for example, and of course it will be clear how these magnets operate the code discs 78, 80, et cetera (also so numbered here to agree with the numbers used earlier), and thus determine the path over which light from the source 22 passes to the light sensors (such as 154, 162) to provide the control for printing and non-printing functions, parity generator at 264, proportional spacing function (differential carriage advance) at 34, and selective printing pressure control at 290.

Parity sensor 264 is a light sensor (such as area 180 of FIG. 12) whose signal is sent over lead 263 to parity check circuit 38 (essentially an exclusive-or circuit), which in turn compares the presence or absence of this signal with the same condition as reported over lead 265 direct from the input amplifier switches. This allows a check on the correctness of all the intermediate stages from 214 to the light sensors. If the comparison is not equal, a pulse is sent to the result pulser 248 over lead 267 to reset the magnet drivers and the momentary interrupt switch, so arranged as to discontinue the T+ voltage and stop further operations. A similar pulse (upon failure of the comparison) may be sent to whatever "input source" 269 is in use, to prevent further input signals, and the bell 271 may notify the attending personnel.

The remainder of the functional block diagram does not require detailed description, as it will be clear from its labels and the description of these parts as already given above, and to some extent detailed below in connection with particular examples of circuitry in FIGS. 17 to 19 and 21. "Reset" output leads 254 from various ones of these functional blocks are indicated, to control the reset pulser 248 as the called-for operations are accomplished. Certain reference numerals on FIG. 16 designate as a whole the individual circuits described below, merely for identification in the block diagram.

Typical drive control circuits

FIGS. 17 and 18 are schematic diagrams of typical drive control circuits, that is, circuits for the control of function-solenoid drive impulses from the light sensed after passage through the set code discs. In both of these, the photoelectric sensor is indicated at 266 as of the photodiode or solar cell type (110 of FIG. 6 or 158, 160 of FIG. 5) and in both the SCR 268 or 270 is thereby controlled to energize a drive solenoid 272 by which the selected function is accomplished as generally described in the earlier application in connection with other code channel sensors. In FIG. 17, the use of a relatively low-cost SCR 268 is shown, which would require preamplification as at amplifier 274 and possibly the coupling capacitor 276. In FIG. 18, pre-amplification of the output signal of the solar cell is not required, with a saving in parts but with an increase in the cost of the SCR 270, which must now be of a higher performance grade. In both circuits, the energy-dissipating diode, and an output-isolating diode, are shown, these being as described in the prior case. Further, the SCR's are commutated off by means of the "Power Control" circuits, which are either the same as those called 'Power Commutators in the previous case, or are of the modified form shown in FIG. 19 hereof.

FIG. 19 illustrates further elaboration of a typical power control arrangement, similar to the Power Commutators of FIG. 45 of the prior case, except that the Power Commutating transistor 275 and its driver 277 are NPN types rather than PNP's. The circuit exhibits certain advantages and simplifications, such as simplified power commutation for control by switch contact openings, and has auxiliary features for use where such are desired or necessary. To avoid a detailed recital of each component, the major parts of this circuit only are described. Thus, the solenoid 272 at the left of the figure is typical of a drive solenoid as described in the prior application which has an electronically timed reset, rather than being reset by operation of a pair of physical contacts. In the case of solenoid 272' at the right of the figure, reset is accomplished upon full stroke of the solenoid-operated member, by the opening of a pair of normally closed contacts 274. The several diodes 281 provide a variety of timing delays (in conjunction with the time-constant capacitor 280) for the control of a unijunction timer circuit 282. Circuit 284 is a hold-off circuit for error control, and is optional; note that its voltage supply is marked "T+" to agree with that legend in FIG. 16 at the Momentary Interrupt Switch 246, so that premature operations of any drives are prevented.

Proportional spacing feed

In the previously-filed application mentioned above, the type font element was advanced step by step, in uniform increments, for each letter or letter-space that was called for by the code series. In the case of high-speed advancing, such as desired for horizontal tabulating, there were provided a pair of advancing solenoids, or one in addition to the normally used one, so that fast alternating use thereof could be put to advantage. FIG. 20 of the present drawings illustrate one way in which non-uniform steps of letter-spacing advance may be obtained, so that, by proper coding, the fact of selection of a particular character can be used to provide a font-advance step appropriate to the "set width" of that character. For example, more spacing advance would be provided for an "m" than for an "i," et cetera.

Only sufficient of a typical font-advance mechanism is shown to permit a clear understanding of the novel aspects. Thus, the font element is assumed to be advanced under control of the pull on a flexible cable 300 wound on a drum secured to a pair of toothed wheels 302 and 304. The font element is assumed to be carried on the "carriage" 306, there being no intention here to refer to a conventional moving paper carriage, although such is within the purview of the possibilities of this method of advance control. A carriage return spring 308 is connected by cable to the same carriage 306, to return it to the line-start position. A pawl 310 engages wheel 302 except when carriage return is desired, thus holding the font carriage at the position last attained.

The teeth of wheel 304 are shown as fairly coarse, these being employed only when the auxiliary solenoid 312 is energized, in rapid alternation with the main solenoid 314, for high-speed tabulating. Solenoid 312 operates the wheel 304 by engagement of its teeth by a spring blade 316, returned upon de-energization by a return spring 318 when the power control for the solenoid is turned off by the opening of contacts 320, about as described in the earlier case.

The teeth of wheel 302 are shown as relatively finer in pitch or spacing, so that the blade 322 can selectively advance the font carriage by smaller increments of distance than does solenoid 312 and blade 316. The effective stroke length of solenoid 314 is controlled by a set of contact pairs 324, 326 and 328, arranged, as shown, to be opened in sequence as blade 322 advances toward the teeth of wheel 302. For example, the contact pair 324 opens when the wheel 302 has been advanced (say) two teeth spaces, contact pair 326 opens when 3 teeth spaces of wheel motion have been produced, and contact pair 328 opens when wheel motion of 4 spaces has been produced. Thus, by determining (under character code control) which of the three pairs of contacts is actually in control of solenoid 314, selective carriage advances of these 3 different magnitudes are readily obtained. It will be seen that all that is required here is the proper positioning of the contacts with respect to notches in, or the end of, the moving core of the solenoid 314. For high-speed (tabulating) advance, that contact pair would control which gave the same feed as solenoid 312, so that alternation of the two solenoids would produce equal steps of carriage or font advance for tabulating purposes (for which fine spacing increments would be superfluous).

Figure 21:
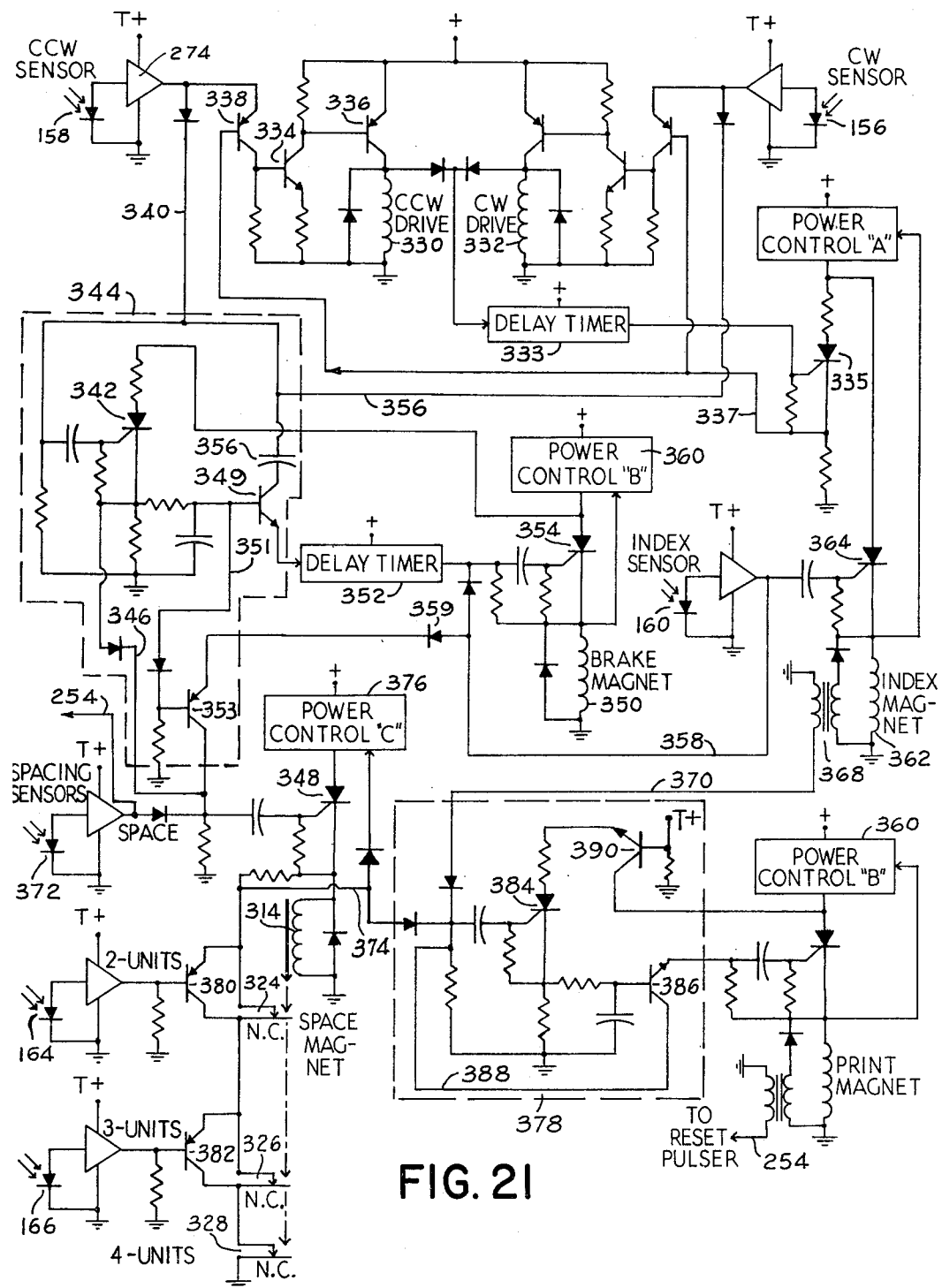
FIG. 21 is a schematic wiring diagram with some components indicated by labeled blocks, of a complete font shaft drive, braking, indexing and power control arrangement, using still another form of basic drive control circuit, and including provision for proportional spacing.

Schematic diagram of fourth variation of a drive control arrangement, including proportional spacing For the purpose of explaining the operation of the proportional spacing arrangement, as well as to show further appropriate forms of drive control in other respects, FIG. 21 has been provided. The numerals used agree with those previously assigned, where applicable. Thus, the CCW drive sensor is designated by 158 as in FIG. 10, and the CW sensor by 156. The corresponding font-drive solenoids are marked 330 and 332. The sensors here are again shown as silicon solar cells, with preamplifiction as at 274 of FIG. 17, and each sensor amplifier controls a driver transistor such as 334 and a power transistor 336, subject to a forward-biased hold-off transistor 338. Typically, a signal from CCW sensor 158 (after amplification at 274, if provided) passes through forward-biased transistor 338, and also over lead 340 turns on SCR 342 in the (enabling) Trigger and Control Circuits package (block) 344. In addition, when SCR 342 conducts, a pulse is supplied over lead 346, and this pulse initiates a carriage spacing action by turning on SCR 348. When SCR 342 fires, it forward biases transistor 349, and over lead 351 reverse-biases transistor 353, for a reason explained below. It will be recalled that the signal from sensor 158 is subject to being "chopped" as by vanes 152 of FIG. 9 (or stripes 208 of FIG. 15) when the font approaches its index position from any distance greater than one font-element character-space away from the index point of the previous character printed. The brake is only desired if the travel to index position exceeds this one-character distance, and the circuitry thus inhibits its braking if no chopping occurs (in the case of selection of the same character or an adjacent character), or if the chopping action produces a second pulse which closely follows the start of the initial current rise at sensor 158 (in the case of selection of a character that is two spaces away from the previous one printed).

The brake magnet 350 is therefore placed under the control of a Delay Timer 352 connected between the gate electrode of its SCR 354 and the lead 340 from sensor 158 (or the equivalent lead 356 from sensor 156). The delay timer will not be started by the initial current rise at the sensor 158, because of capacitor 356; also, if the second pulse (resulting from the chopping action mentioned above) closely follows the initial rise, the delay timer cannot fire SCR 354 and energize the brake magnet. Braking will, however, occur whenever the font element has to travel a considerable distance before the desired character is brought to index position. Note that a connection 358 from the index sensor 160 ensures that the brake will be energized whenever the index position is reached, if it has not been previously turned on via delay timer 352. This is because the index mechanism has limited stopping ability and it is desired to use the braking mechanism, even though momentarily, for a period following arrival of the font element very close to the final stopped position. SCR 354 is in all cases turned off by Power Control B 360 when the braking action has been fully completed, but the Index magnet 362 normally remains energized somewhat longer. In the case of the particular type of font element 20, as described in the prior application, final registration of the character during printing impact does not depend on continued energization of the Index magnet 362.

The way in which the Index magnet 362 is turned on by its SCR 364 under control of Index sensor 160 is obvious. The transformer 368 provides a pulse over lead 370, on cut-off of SCR 364, for a purpose to be described below.

In the case of a "repeat" character (when no drive impulse to the font is involved), spacing for the letter-width is of course nevertheless required. This is initiated by a pulse from the Index sensor 160 over lead 358 and diode 359 through the transistor 353 to fire SCR 348 as before. This triggering of the spacing action from the Index sensor 160 is inhibited if spacing had been initiated either from the CW or CCW sensors 156, 158, because of the reverse bias of transistor 353 mentioned above, whenever SCR 342 is conducting.

As already stated, the initiation of font-driving action from the CW sensor 158 involved the hold-off transistor 338. The purpose of this transistor is as follows. When drive magnet 330 (or 332) is first turned on, a Delay Timer 333 is triggered. Its time delay is made equal to the time required for full stroke (pull-in) operation of the drive magnet. The timer output pulse is used to turn on SCR 335, and this provides a hold-off voltage over lead 337 to reverse-bias the transistor 338 so that continued signal from sensor 158 will not maintain current flow in the magnet 330, to avoid overheating. The sensor, of course, will often continue to be energized for a major period while the font element is traveling toward the index (ready-for-printing) position for the next character, and since the drive magnet has completed its work shortly after the font element starts to move, it can be cut off long before the index position is reached.

The circuitry in the lower left corner of FIG. 21 concerns the control for proportional spacing as mechanically illustrated in FIG. 20. The spacing sensor 372 (such as indicated at 170 in FIG. 7 or 110 in FIG. 6) is the one which provides a blank word space of the normal 4-unit (say) size between words or after punctuation. When energized, its SCR 348 fires the space magnet 314 (see also FIG. 20) which advances wheel 302 of FIG. 20 4 units, whereupon contacts 328 open, and a positive pulse on line 374 cuts off the Power Control C 376 and is also supplied to the Enable and Trigger circuit 378. The reason that contacts 324 and 326 are noneffective to pulse the line 374 is that, in the absence of a proportional spacing code condition, transistors 380 and 382 are conducting, and hence short-circuit the corresponding contacts 324 and 326. Spacing under control of sensor 372 also signals the Reset Pulser 248 (FIG. 20) over one of the reset leads 254, as indicated.

When proportional spacing for a character imprint is called for, however, and either of sensors 164 or 166 is energized by light passed thorugh the character-selecting clear channel of the code disc assembly, by the optical arrangements of FIGS. 5–7 and 11, one of the contact sets 324 or 326 will not be short-circuited as above, and the cut-off pulse on line 374 to Power Control 376 will occur only after 2 (or 3) units of movement of the carriage. If neither sensor 164 or 166 is so energized, a full advance (4 units) will result, when the cut-off pulse results from opening of contacts 328.

The utilization of this kind of proportional spacing control, in which a carriage or font element is selectively advanced different amounts by controlling the effective throw of a ratchet-wheel driving magnet, is not limited to a system employing photoelectric decoding or selecting and translating techniques. Thus it could, for example, be employed in a system such as described in the earlier application, in which contact closures form the selected output condition of the mechanism.

Printing operation is enabled by a signal resulting from completion of the Index operation by a pulse over lead 370, or by completion of the letter Space operation over lead 374, whichever occurs first. A positive pulse from either source turns on SCR 384 in Enable and Trigger circuit 378. When SCR 384 conducts, transistor 386 is forward biased, ready for conduction when current flows to it over lead 388 due to a pulse from the other source (lead 374 or 370). Thus, either Index or letter Space first "enables" the Print magnet circuit, and the other actually initiates the Print operation. Transistor 390 is forward biased by the "T+" supply, and operates to turn off SCR 384 when it has been turned on by a simple word-spacing operation initiated by sensor 372; that is, one not associated with an Index operation. This leaves package 378 ready for its normal function as just described.

As has been mentioned above, the invention provides for a variation or modulation of the printing impact provided by the print magnet for the different characters of the font. Printing Pressure Control 290 can accomplish this in various ways, for example by varying the amplitude of the current pulse that is supplied to the print magnet, or by varying the time-duration or length of a pulse of relatively fixed amplitude. The essential point of novelty here lies not in the details of this circuitry, but in the concept of utilizing the same signal that provides proportional spacing control (which also varies as between characters) to effect the printing pressure variation. Obviously, this feature is not limited to use in a machine employing the particular (photo-optical) selector herein described, but is applicable as well to machines (such as described in my prior application, for example) using other types of selector mechanisms.

The invention as a whole has been described herein in connection with various special features which are advantageous for some applications, but are not a requirement insofar as other features are concerned. Thus, it is by no means essential that the optical assembly be illuminated by the particular folded incandescent-lamp system of FIG. 1; the optical system could be straight, with no angle reflector, and also compactness of lateral dimensions could be achieved by using various alternate light sources such as fluorescent or electro-luminescent sources in general. The approximate size scale of the parts can be appreciated from the fact that the circular solar cell arrays of FIGS. 5, 7 and 10–15 are currently of nominal 1.2 inches in outside diameter. Therefore, the material of the code discs has had to be shown as of exaggerated thickness for clarity. These discs may typically be only 5 thousandths of an inch thick, and they are of any suitable light weight material such as thin metal. To minimize distortions thereof that would be involved in machining them for slots or apertures, the use of a material which can be chemically milled or etched to produce the desired configurations is recommended. The thickness of the supporting annulus 66 in FIG. 5 may be of the order of 10 to 12 thousandths of an inch to provide adequate stiffness in view of its supporting function.

It will be recognized that the invention provides arrangements for locating clear channels lying within a set of possible angularly, as well as radially, spaced locations which are represented by potentially light-transmitting channels. The complete "set" of possible channels is represented in FIGS. 4 through 7 as comprising sub-sets of possible channels lying at different radii (70, 72, 74) with respect to the axis of the shaft being controlled (which is the same as the axis about which the code discs execute their slight motions in being selectively deflected from the binary "1" position to the binary "0" position, or vice versa). The outermost radius of the possible channel positions is indicated in FIG. 5 by numeral 118, but the code discs also provide angularly-spaced possible clear-channel positions at smaller radii, two of these being shown in FIG. 5 as so located that a clear channel can direct light to the underside of the lower photosensitive disc 162.

Thus, the entire set of possible code channels is much greater than could be accommodated in a single ring of apertures through the code discs, and in fact consists of several different-radius subsets. In FIG. 7, there are four different-radius subsets. This figure also shows channels of one subset, the outermost one, leading to an array of individual fixed photosensors such as 170. An actual physical scanning of many of the possible channel positions occurs for the subset at the radius of channel 120 in FIG. 7, as a result of the rotation of element 132, and response to a clear channel in any of the other subsets results from the fact that only particular photosensors (162, 170) are energized by light passing through particular locations, within these subsets, opened up by the code disc settings.

While the code discs have been described as having code apertures, it will be understood that the discs may be made of light-transmitting material, and the aperture-positions produced by selectively masking the discs with opaque coatings or the like, or the patterns may be made photographically.

I claim:
1. In a printing machine, a character font, font positioning means including bidirectional driving means operating on said font to effect a character selection, means providing a light beam, a plurality of two-position shutters, each apertured in accordance with a binary coding scheme, in the path of said light beam for obturating the transmission of said beam except at a selected position, out of a plurality of possible positions, which selected position is defined by a plural-bit code signal selectively positioning said shutters, light-sensing means controlled by the position of said font relative to the said selected position for establishing the direction of motion of said font required to bring a selected character on said font over the shortest available path towards a ready-for-printing position, means for energizing said driving means in the direction established by said sensing means, means responsive to the transmission of light through said shutters, at said selected position, for controlling the operation of said driving means to bring the selected character into ready-for-printing position, and means responsive to the transmission of light through certain of said positions for differentially controlling the printing space allocated to successive selected characters.

2. Code responsive apparatus for selectively controlling the performance of plural functions, some of which involve the precise positioning of a movable member, comprising, in combination:
  (a) a plurality of superposed code elements each having coded light-transmitting apertures arranged in spaced subsets of the totality of such apertures, and each positionable between respective set and unset binary positions so as to establish, for the various combinations of the positions thereof, respective light-transmitting clear channels through said code elements,
  (b) code-responsive means for controlling the set and unset positions of each of said elements,
  (c) an optical system for illuminating said code elements so as to transmit light through any such clear channel,
  (d) first photosensitive means for sensing the transmission of light through such a channel which is within a first subset of the totality of all the possible clear channels,
  (e) means including said movable member for producing a relative scanning movement between said photosensitive means and said first subset of the totality of all the possible clear channels,
  (f) means responsive to said photosensitive means for controlling the scanning movement of said member to bring it to a particular position defined by the occurrence of a clear channel among said first subset of channels,
  (g) second photosensitive means for sensing the transmission of light through a clear channel in another subset of said totality of possible clear channels, and
  (h) means controlled by said second photosensitive means for initiating the performance of auxiliary functions.

3. Apparatus in accordance with claim 2, in which said first photosensitive means comprises spaced independent photosensing segments all mounted for scanning motion with said movable member in accordance with the direction and extent of motion required of said movable member.

4. Apparatus in accordance with claim 2, in which said means for controlling the scanning movement of said member includes means for controlling the speed of approach of said member to its final position.

5. Apparatus in accordance with claim 2, in which said movable member is a rotary member, and in which the means for producing a relative scanning movement includes a rotary optical element secured to said rotary member for rotation therewith and comprising separate reflecting surfaces for directing light from a clear channel to respective portions of said first photosensitive means in accordance with the direction and extent of motion required of said rotary member.

6. A photo-optical logical unit for controlling the successive rest positions of a machine element that is intermittently movable in either of two directions through a cyclical path to any one of a fixed number of possible rest positions, comprising a light source, a plurality of digitally-positionable coded shutters settable to select a uniquely-positioned clear optical path from said light source and through said shutters from amongst a plurality of optical paths simultaneously illuminated by said light source, with each of said paths defining one of said possible rest positions, movable means adapted for connection to said machine element for sequentially scanning said optical paths, a plurality of photo-electric sensing means for sensing the instantaneous position of said movable means relative to any selected clear optical path to indicate the shortest direction of movement of said machine element to said selected rest position, and a further photo-electric sensing means for sensing the arrival of said movable means substantially at the position defined by said shutters.

7. A photo-optical logic unit in accordance with claim 6, including two additional photo-electric sensing means for sensing the position of said movable means when its instantaneous position reaches close proximity to the position of the clear optical path defined by said shutters.

8. A logical unit in accordance with claim 6, including means for sensing the approach of said movable means to the position defined by said shutters.

9. A logical unit in accordance with claim 8, and means controlled by said approach-sensing means for anticipatorily modifying the speed of movement of said movable means.

10. A logical unit in accordance with claim 6, and means controlled by said further sensing means for interrupting the motion of said movable means when it arrives at a position determined by said shutters.

11. A logical unit in accordance with claim 10, and means controlled also by said further sensing means for indexing the position of said movable means upon its arrival at a position closely adjacent the one determined by said shutters.

12. In combination with a machine shaft and power means for driving the same through rotation thereof, a unitary optical logic unit for controlling said power means to position said shaft successively at positions defined by successive code signals, said logic unit comprising a plurality of binary-coded shutters settable under control of such code signals to define successive angular positions of said shaft about its axis, a light source for directing light simultaneously toward all possible paths defined by said shutters, a rotatable optical element connected to said shaft for deflecting light passing from said source through a clear optical channel defined by each combination of set shutters, and photoelectric means comprising at least three sensing elements for sensing the passage of light deflected by said optical element and thereby the position and movement of said optical element and shaft with relation to the position specified by said shutters, and means controlled by the electrical output of said photo-electric means for energizing said power means.

13. The combination of claim 12, and means controlled by the electrical output of said photoelectric means for selecting the direction of action of said power means.

14. The combination of claim 12, and means controlled by the electrical output of said photoelectric means for regulating the degree of force applied by said power means to said optical element and said shaft.

15. The combination of claim 12, and means forming a part of said rotatable optical element for modulating the magnitude of the light transmitted through said clear channel as said element approaches the position defined by said shutters.

16. The combination of claim 12, in which said optical element comprises segmented annularly conical light reflecting means.

17. The combination of claim 12, including means responsive to the approach of the angular position of said optical element to the position defined by said shutters, for applying a braking force to said element.

18. The combination of claim 12, and means controlled by said photoelectric means for selecting the direction of energization of said power means to drive said shaft through the smaller of the two angles separating the desired new position of said shaft from its last previous selected position.

References Cited

UNITED STATES PATENTS

| | | | |
|---|---|---|---|
| 2,663,399 | 12/1953 | Frey et al. | 197—84 |
| 3,239,049 | 3/1966 | Voit | 197—17 X |
| 2,875,879 | 3/1959 | Auerbach | 197—14 |
| 1,054,582 | 2/1913 | Marchthal | 197—12 |
| 2,211,320 | 8/1940 | Efron | 95—4.5 X |
| 2,402,719 | 6/1946 | Allison | 95—4.5 X |
| 2,408,754 | 10/1946 | Bush | 95—4.5 X |
| 2,438,825 | 3/1948 | Roth | 178—17 X |
| 2,510,093 | 6/1950 | Ferguson et al. | 95—4.5 X |
| 2,739,304 | 3/1956 | John | 95—4.5 X |
| 2,744,457 | 5/1956 | Higonnet et al. | 95—4.5 |
| 2,803,178 | 8/1957 | Lotz | 95—4.5 |
| 2,807,664 | 9/1957 | Kleinberg et al. | 178—34 |
| 2,861,262 | 11/1958 | Pankove | 178—17 X |
| 2,927,676 | 3/1960 | Abbondanza | 197—6.6 |
| 2,944,471 | 7/1960 | Drillick | 95—4.5 |
| 2,945,576 | 7/1960 | Lapointe et al. | 197—18 X |
| 3,032,163 | 5/1962 | Flieg | 197—1.5 |
| 3,191,510 | 6/1965 | Carmack et al. | 95—4.5 |
| 3,204,539 | 9/1965 | Plooij | 95—4.5 |
| 3,227,258 | 1/1966 | Pannier et al. | 197—6.6 |
| 3,232,404 | 2/1966 | Jones | 197—107 X |
| 3,306,416 | 2/1967 | Dahlin et al. | 197—6.6 |

EDGAR S. BURR, Primary Examiner

U.S. Cl. X.R.

95—4.5; 178—17, 34; 197—17; 350—6, 285, 286